US011415669B2

(12) United States Patent
Khojastepour et al.

(10) Patent No.: US 11,415,669 B2
(45) Date of Patent: Aug. 16, 2022

(54) WALK-THROUGH GATE WITH SIGNAL SEPARATION

(71) Applicant: NEC Laboratories America, Inc., Princeton, NJ (US)

(72) Inventors: Mohammad Khojastepour, Lawrenceville, NJ (US); Mustafa Arslan, Princeton, NJ (US); Sampath Rangarajan, Bridgewater, NJ (US)

(73) Assignee: NEC Corporation

( * ) Notice: Subject to any disclaimer, the term of this patent is extended or adjusted under 35 U.S.C. 154(b) by 379 days.

(21) Appl. No.: 16/578,967

(22) Filed: Sep. 23, 2019

(65) Prior Publication Data

US 2020/0225319 A1    Jul. 16, 2020

Related U.S. Application Data

(60) Provisional application No. 62/791,143, filed on Jan. 11, 2019.

(51) Int. Cl.
| *G01S 7/41* | (2006.01) |
| *G01V 15/00* | (2006.01) |
| *G01V 3/36* | (2006.01) |
| *G01S 13/00* | (2006.01) |
| *G01S 13/02* | (2006.01) |

(52) U.S. Cl.
CPC ............. *G01S 7/411* (2013.01); *G01S 13/006* (2013.01); *G01S 13/02* (2013.01); *G01V 3/36* (2013.01); *G01V 15/00* (2013.01)

(58) Field of Classification Search
CPC ...... G01S 13/88; G01S 13/888; G01S 13/887; G01V 8/005; G01V 15/00; H01Q 15/00; H01Q 15/14; H01Q 15/16
See application file for complete search history.

(56) References Cited

U.S. PATENT DOCUMENTS

| 6,334,365 B1* | 1/2002 | Linker ................. G01N 1/2214 73/864.71 |
| 6,965,340 B1* | 11/2005 | Baharav .................. G01S 13/89 342/22 |
| 7,183,963 B2* | 2/2007 | Lee ........................ G01N 22/00 342/175 |
| 7,187,281 B2* | 3/2007 | Yuki ..................... G01V 8/005 250/341.8 |

(Continued)

FOREIGN PATENT DOCUMENTS

| JP | 2000-338262 A | 12/2000 |
| WO | 2012-107900 A1 | 8/2012 |

OTHER PUBLICATIONS

Marta Carbone et al., "Public Review for Dummynet Revisited", ACM SIGCOMM Computer Communication Review, Apr. 2010.

*Primary Examiner* — Peter M Bythrow
(74) *Attorney, Agent, or Firm* — Joseph Kolodka

(57) ABSTRACT

Devices and systems for implementing a walk-through gate are provided. The devices include a walk-through gate structure having boundaries that have curved inner surfaces on each side of a cavity. The curved inner surfaces are partially covered by a reflective material. The devices include radio frequency (RF) signal transmitters positioned tangent to the curved inner surfaces and RF signal receivers. The devices also include apertures that provide access to the cavity of the walk-through gate structure.

15 Claims, 5 Drawing Sheets

(56) References Cited

U.S. PATENT DOCUMENTS

| | | | | |
|---|---|---|---|---|
| 7,239,151 B2* | 7/2007 | Bailey | ............... | A41H 1/02 |
| | | | | 324/644 |
| 7,415,244 B2* | 8/2008 | Kolinko | ............... | G01V 8/005 |
| | | | | 342/179 |
| 7,671,784 B2* | 3/2010 | Steinway | ............... | G01S 13/86 |
| | | | | 342/22 |
| 8,681,035 B2* | 3/2014 | Baharav | ............... | H01Q 1/2216 |
| | | | | 342/22 |
| 8,890,745 B2* | 11/2014 | Wahlquist | ............... | G01S 13/04 |
| | | | | 342/22 |
| 9,052,700 B2* | 6/2015 | Saidj | ............... | G05B 1/00 |
| 9,243,449 B1* | 1/2016 | Ziemkowski | ............... | E05F 15/00 |
| 9,316,732 B1* | 4/2016 | Mohamadi | ............... | H01Q 21/061 |
| 9,791,553 B2* | 10/2017 | Rose | ............... | G06T 15/04 |
| 9,891,314 B2* | 2/2018 | Morton | ............... | G01S 13/887 |
| 10,096,181 B2* | 10/2018 | Reymann | ............... | E05F 15/76 |
| 10,295,664 B2* | 5/2019 | Valdes | ............... | G01S 13/003 |
| 10,338,214 B2* | 7/2019 | Ellenbogen | ............... | G01S 13/867 |
| 10,481,256 B2* | 11/2019 | Jones | ............... | G01S 13/04 |
| 10,551,490 B2* | 2/2020 | Qi | ............... | G01S 13/9088 |
| 2004/0090359 A1* | 5/2004 | McMakin | ............... | G01S 13/89 |
| | | | | 342/22 |
| 2004/0140924 A1* | 7/2004 | Keller | ............... | G01S 13/887 |
| | | | | 342/22 |
| 2005/0110672 A1* | 5/2005 | Cardiasmenos | ... | G01N 21/3581 |
| | | | | 342/27 |
| 2005/0230604 A1* | 10/2005 | Rowe | ............... | G01S 13/887 |
| | | | | 250/221 |
| 2005/0231417 A1* | 10/2005 | Fleisher | ............... | G06K 9/00369 |
| | | | | 342/22 |
| 2006/0017605 A1* | 1/2006 | Lovberg | ............... | G01K 7/226 |
| | | | | 342/22 |
| 2006/0164240 A1* | 7/2006 | Patchell | ............... | G07C 9/00 |
| | | | | 340/552 |
| 2006/0213992 A1* | 9/2006 | Ishikawa | ............... | G07C 9/10 |
| | | | | 235/451 |
| 2007/0263907 A1* | 11/2007 | McMakin | ............... | G06K 9/00369 |
| | | | | 382/115 |
| 2008/0191925 A1* | 8/2008 | Martin | ............... | G01V 8/005 |
| | | | | 342/22 |
| 2009/0032585 A1* | 2/2009 | Kocznar | ............... | G07C 9/10 |
| | | | | 235/382 |
| 2009/0073023 A1* | 3/2009 | Ammar | ............... | G01S 17/89 |
| | | | | 342/22 |
| 2009/0322873 A1* | 12/2009 | Reilly | ............... | G01S 13/89 |
| | | | | 348/143 |
| 2010/0052867 A1* | 3/2010 | Kwok | ............... | G01V 15/00 |
| | | | | 340/10.42 |
| 2010/0214150 A1* | 8/2010 | Lovberg | ............... | H01Q 3/06 |
| | | | | 342/22 |
| 2010/0220001 A1* | 9/2010 | Longstaff | ............... | G01S 13/003 |
| | | | | 342/22 |
| 2011/0030875 A1* | 2/2011 | Conte | ............... | F16L 55/1652 |
| | | | | 156/64 |
| 2011/0043403 A1* | 2/2011 | Loffler | ............... | G01S 13/887 |
| | | | | 342/25 A |
| 2011/0095892 A1* | 4/2011 | Hong | ............... | G06K 7/10356 |
| | | | | 340/572.7 |
| 2011/0102597 A1* | 5/2011 | Daly | ............... | G01S 13/887 |
| | | | | 348/162 |
| 2011/0163231 A1* | 7/2011 | Salmon | ............... | G01V 8/005 |
| | | | | 250/336.1 |
| 2012/0105267 A1* | 5/2012 | DeLia | ............... | G01V 8/005 |
| | | | | 342/22 |
| 2013/0162406 A1* | 6/2013 | Saidj | ............... | G01S 13/87 |
| | | | | 340/10.1 |
| 2015/0054623 A1* | 2/2015 | Thomas | ............... | G01V 15/00 |
| | | | | 340/10.1 |
| 2016/0042333 A1* | 2/2016 | Ho | ............... | H04W 4/029 |
| | | | | 705/41 |
| 2016/0216371 A1* | 7/2016 | Ahmed | ............... | G01V 8/005 |
| 2017/0055157 A1* | 2/2017 | Bergdale | ............... | G07B 15/02 |

* cited by examiner

WALK-THROUGH GATE WITH SIGNAL SEPARATION

RELATED APPLICATION INFORMATION

This application claims priority to U.S. Provisional Patent Application No. 62/791,143, filed on Jan. 11, 2019, incorporated herein by reference herein its entirety.

BACKGROUND

Technical Field

The present invention relates to walk-through gates and more particularly to the physical design of walk-through gates.

Description of the Related Art

Walk-through gates are used for scanning objects passing through a defined space. Walk-through gates can be implemented as metal detectors for pedestrians or as checkout tunnels. Walk-through gates can be used for security control and to detect particular objects (for example, metal) carried into a restricted area.

SUMMARY

According to an aspect of the present invention, a device is provided for implementing a walk-through gate. The device includes a walk-through gate structure having boundaries that have curved inner surfaces on each side of a cavity. The curved inner surfaces are partially covered by a reflective material. The devices include radio frequency (RF) signal transmitters and RF signal receivers. The devices also include apertures that provide access to the cavity of the walk-through gate structure.

According to another aspect of the present invention, a device is provided for implementing a walk-through gate. The device includes a walk-through gate structure having boundaries formed from arcs of a circle on each side of a cavity. The boundaries are covered by a reflective material. The device includes radio frequency (RF) signal transmitters positioned tangent to the boundaries and RF receivers positioned tangent to the boundaries. The devices include apertures that provide access to the cavity of the walk-through gate structure. The device also includes processing devices that perform signal space separation between a region inside of the walk-through gate structure and a region outside of the walk-through gate structure.

According to another aspect of the present invention, a system is provided for implementing a walk-through gate. The system includes a processor device operatively coupled to a memory device. The processor device receives a transmission at a receiver positioned in a walk-through gate structure having boundaries including curved inner surfaces on each side of a cavity. The curved inner surfaces are covered by a reflective material. The processor device performs signal space separation between a region inside of the walk-through gate structure and a region outside of the walk-through gate structure. The processor device determines whether the signal was transmitted from a radio frequency identifier (RFID) within the boundaries of the walk-through gate structure. The processor device processes a transaction based on the RFID in response to determining that the signal was transmitted from within the boundaries of the walk-through gate structure.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Figure 1:
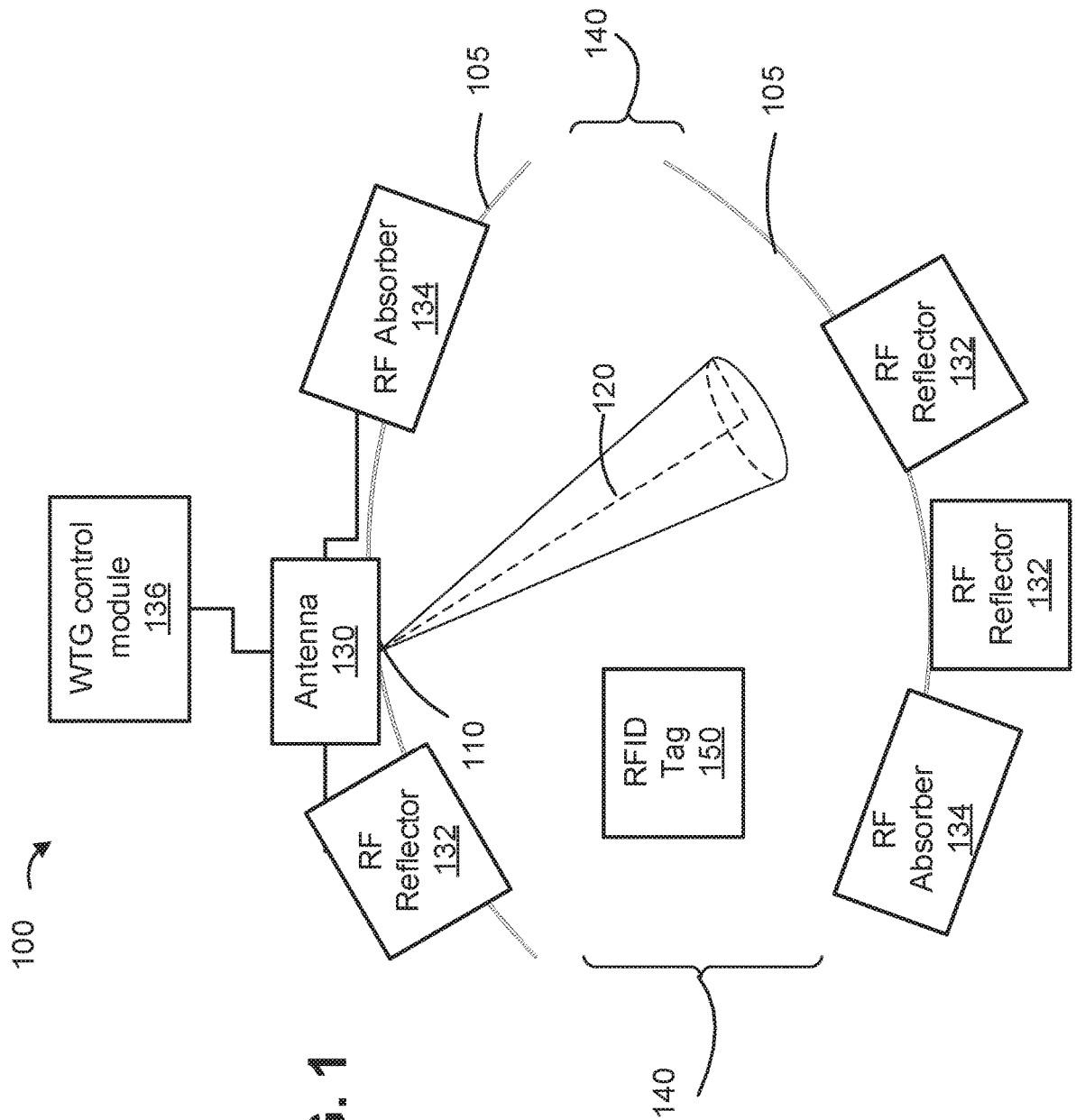
FIG. 1 is a block diagram illustrating a walk-through gate with signal separation, in accordance with an embodiment of the present invention.

In accordance with embodiments of the present invention, systems and methods are provided to/for implementing a walk-through gate that includes an isolating chamber. Example embodiments of walk-through gates (WTGs) can be fabricated (or constructed) to include an open cavity comprised of boundaries that are in the form of arcs and given openings that can be interpreted as linear aperture.

In one embodiment, the isolating chamber can be implemented to have a strong differentiation property that separates the radio frequency (RF) signals inside the open cavity from the RF signals outside the cavity. Example embodiments can include quadrants having multiple reflection points, in which flipside and crosswise transmission are designed to allow signals to exit the cavity after a predetermined minimum attenuation.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

Each computer program may be tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Referring now in detail to the figures in which like numerals represent the same or similar elements and initially to FIG. 1, a high-level system/method for implementing a walk-through gate with signal separation is illustratively depicted in accordance with one embodiment of the present invention.

As shown in FIG. 1, a walk-through gate (WTG) 100 can include curvature panels (or walls) 105 with an opening 110 through which a radio frequency (RF) signal 120 is transmitted. In example embodiments, the walk-through gate structure has boundaries including curved inner surfaces arranged in a concave manner on each side of a cavity.

The WTG 100 (which can also be referred to as a tunnel) is designed to provide (or amplify) signal space separation between two regions, namely the inside and outside of the WTG 100. The signal space separation can be implemented based on the shape of the WTG 100 and inside structure of the WTG 100. The surface of the structural curvature 105 can be covered by a reflective material (RF reflector) 132 and, in example embodiments, in part by an absorbing material (RF absorber) 134. The positioning of the reflective material 132 and the absorbing material 134 can be implemented in accordance with having a strong differentiation property that separates the radio frequency (RF) signals inside the open cavity from the RF signals outside the cavity. Example embodiments described herein provide an overview of the design and particular curvature formulations. The curvature 105 described herein are designed to contain as much as power of the transmitted signals 120 from the inside antennas 130 in the inside volume of the WTG 100 while keeping the power of outside antennas (not shown in FIG. 1) away from the inside of WTG 100.

In example scenarios described herein, a partially closed space (or cavity, internal space, etc.) is generated (within the WTG 100) that can contain the RF signal 120 within itself. The RF signal 120 enters the cavity from an antenna 130 on the boundary (curvature walls 105) instead of entering such partially closed space or equivalently open cavity (for example, the space between the curvature walls 105) through an opening (or aperture) 140. An RF signal 120 may escape from the open cavity through its opening 140. Similarly, an RF signal 120 may enter the cavity and then reflect off of the internal walls or boundary (curvature walls 105) of the cavity or get absorbed by the internal walls or boundary 105 of the cavity.

The opening of the cavity is referred to as an aperture 140. The open cavity can have one or more aperture 140 (that can include the opening 110, through which RF signal 120 enters the cavity). The example embodiments enable a design in which an RF signal 120 that enters with a particular angle from a point on the aperture to get trapped inside the cavity. The RF signal 120 can be permanently entrapped through a combination of reflection and absorption.

In alternate example embodiments, the WTG 100 and corresponding cavity is designed to reflect the RF signals 120 that enter the cavity in particular directions off of its cavity (and out of the WTG 100).

In example embodiments, open cavities can be designed to differentiate between the internal space of the cavity (that is enclosed by the cavity boundary and its aperture) and the outside of the cavity (of the WTG 100). The differentiation can be implemented by designing the cavity to entrap the signals that are generated by an antenna that is on the cavity boundary and not directly transmitted out of an aperture 140. This means that as long as a source on the cavity boundary (for example, antenna 130) generates an RF signal 120 that is transmitted toward another point on the boundary the RF signal 120 may not escape the open cavity through its aperture (for example, not via opening 140) even after multiple reflections.

In further example embodiments, the design of the WTG 100 can be less constrained if the RF signals 120 are allowed to get out of cavity after a given attenuation. For example, if the original RF signal 120 is 31 dBm, the WTG 100 can be designed to allow the signals to escape the aperture 140 if the RF signal 120 is less than 10 dBm (which means that the WTG 100 in this instance is designed for a minimum of 21 dB attenuation). The WTG 100 can be implemented with a designed curvature that includes reflective and absorption property that allows Note that due to reciprocity, as the WTG 100 is designed for the RF signals 120 generated within the cavity to not be able to escape the cavity of the WTG 100, any signal that enters the cavity of the WTG 100 has to escape the cavity through a finite number of reflections inside the cavity and from the reflective part of the cavity or gets absorbed by the cavity, for example by hitting absorbers 134 (deployed, for example, on curvature walls 105). RF signal transmitter can generate a signal that is transmitted toward another point on the curved inner surfaces that can escape the cavity after a minimum number of reflections inside the cavity. Therefore, the example cavities (of the WTG 100) are implemented (for example, manufactured, assembled, fabricated, etc.) with a strong differentiation property that separate the RF signals 120 inside the open cavity from the RF signal (not shown) outside. Hence, the WTG 100 that includes this differentiation property for an open cavity is referred to herein as including an isolating chamber.

The example embodiments described herein provide a particular design of an isolating chamber. The designs described herein provide guidelines that can be used in different setting and using different geometrical shapes that include curved inner surfaces. Specifically, the example embodiments include boundaries 105 that are comprised of multiple arcs of a circle in a two-dimensional cross section. Other example embodiments can include partial ellipses, etc. A point on the boundary 105 may be a reflector 132 (for example, a metal sheet, etc.) or a RF absorber 134.

The curved inner surfaces can include a convex surface comprised of RF reflective material. In example embodiments, at least part of the outer portions (for example, the premier) of the convex surface comprised of RF reflective material can be lined with RF absorbing material. In example embodiments, a mid-section of the curved inner surfaces can include RF reflective material and a remaining section of the curved inner surfaces include RF absorbing material.

When a beam (for example, RF signal 120 or another beam that enters the cavity from outside of the WTG 100) is transmitted from an antenna (for example, antenna 130 or an antenna outside of the WTG 100), the beam may bounce back from a reflecting object. The reflected beam in turn can be reflected from another object, and so on. The reflection order of the transmitted wave before bouncing back from any reflector is zero.

The number of reflections is a property of the wave that can be used to deduce the possible average length that the wave has travelled from the source, or to estimate the average signal strength of the wave since after each reflection, part of the wave energy is absorbed by the reflecting object (for example reflector 132). This is applicable both to the signals that are generated inside the cavity or those that come inside the cavity through an aperture and then are reflected back (for example, out of the cavity) by hitting a reflective part of the curvature.

In some other example scenarios, where the wave is reflected from the boundaries of a closed or partially closed space, such as an open cavity (as described herein above), the WTG control module 136 can use the number of reflections to deduce the wave coverage within the cavity (for example, during a manufacturing phase).

For example, the WTG 100 can be designed as an isolating chamber for a wave that is transmitted by an antenna 130 on the interior boundary of the chamber to either have no wave with reflection order greater than zero inside or have (for example, all) partial waves (for example, with any reflection order) inside the cavity. This means that any wave that is generated inside the cavity will remain inside the cavity or absorbed by the cavity. RFID tags 150 that transmit within the WTG 100 can thereby be separated from transmissions that occur outside the WTG 100 (for example, from other RFID tags 150).

As employed herein, the term "hardware processor subsystem" or "hardware processor" can refer to a processor, memory, software or combinations thereof that cooperate to perform one or more specific tasks. In useful embodiments, the hardware processor subsystem can include one or more data processing elements (e.g., logic circuits, processing circuits, instruction execution devices, etc.). The one or more data processing elements can be included in a central processing unit, a graphics processing unit, and/or a separate processor- or computing element-based controller (e.g., logic gates, etc.). The hardware processor subsystem can include one or more on-board memories (e.g., caches, dedicated memory arrays, read only memory, etc.). In some embodiments, the hardware processor subsystem can include one or more memories that can be on or off board or that can be dedicated for use by the hardware processor subsystem (e.g., ROM, RAM, basic input/output system (BIOS), etc.).

In some embodiments, the hardware processor subsystem can include and execute one or more software elements. The one or more software elements can include an operating system and/or one or more applications and/or specific code to achieve a specified result.

In other embodiments, the hardware processor subsystem can include dedicated, specialized circuitry that performs one or more electronic processing functions to achieve a specified result. Such circuitry can include one or more application-specific integrated circuits (ASICs), field-programmable gate arrays (FPGAs), and/or programmable logic arrays (PLAs).

These and other variations of a hardware processor subsystem are also contemplated in accordance with embodiments of the present invention.

Figure 2:
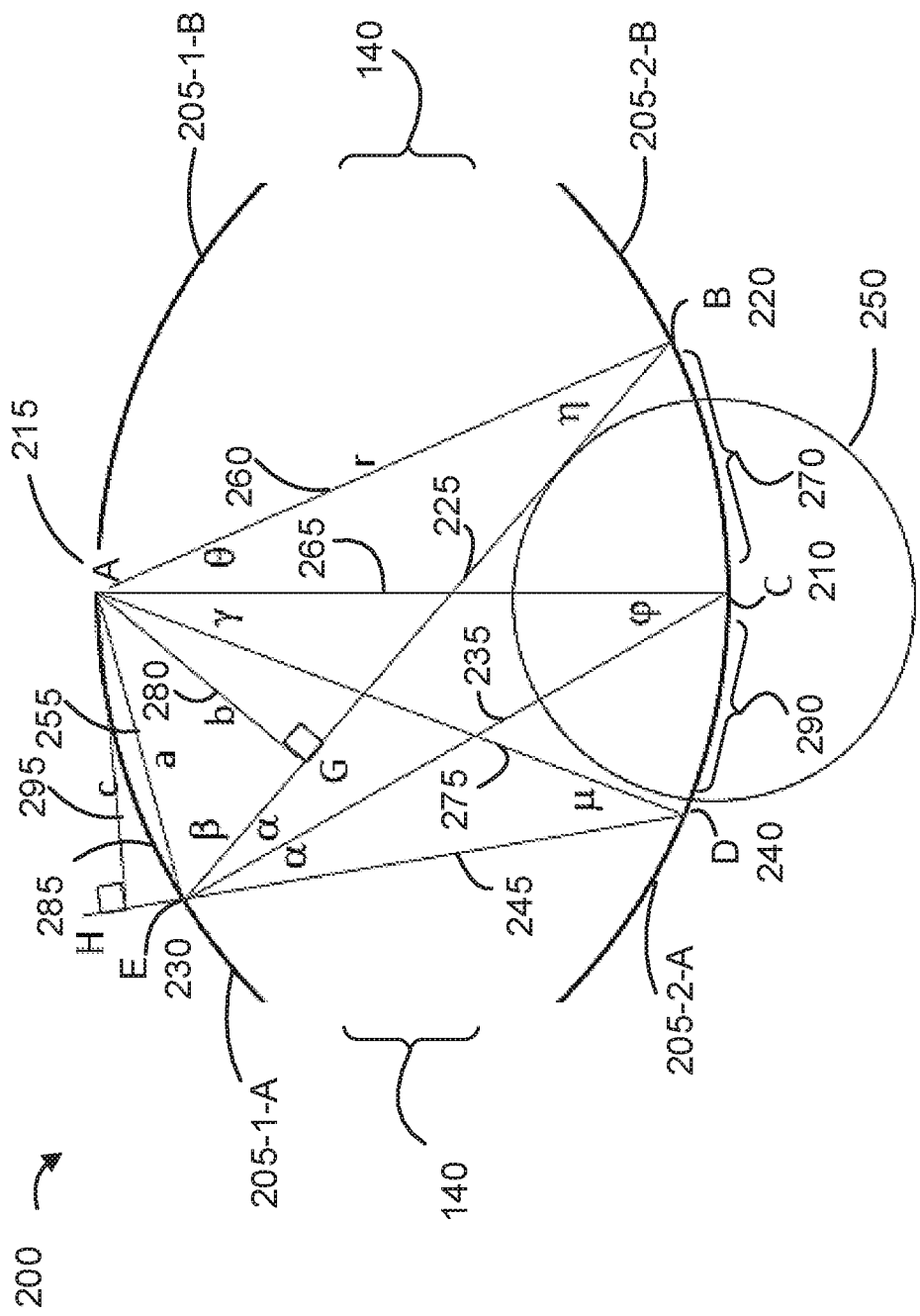
FIG. 2 is a block diagram illustrating a two-dimensional model of an isolating chamber, in accordance with the present invention.

FIG. 2 is a block diagram illustrating a design 200 of an isolating chamber (of a walk-through gate), in accordance with example embodiments.

As shown in FIG. 2, a design of an isolating chamber 200 is illustrated. The ensuing discussion is conducted with regards to a two-dimensional (2D) space for purposes of clarity and can be extended to a three-dimensional (3D) space. The isolating chamber 200 includes an open cavity that is comprised of boundaries 205 that are in the form of arcs and given openings 140 that can be interpreted as linear aperture.

In example embodiments, isolating chamber 200 includes two arcs 205 (shown as 205-1 (with left and right halves 205-1-A and 205-1-B, as further described herein below) and 205-2 (with left and right halves 205-2-A and 205-2-B)) of a circle (or circles) with radius R that are placed in a mirror image symmetrical to a divider line as in FIG. 2. In this configuration the center of the arc on the top (boundary 205-1) is denoted as (for example, assumed to be) the point C 210 and the center of the arc at the bottom (boundary 205-2) is denoted by point A 215.

Consider a point of transmission B (220) (for example, from an RF antenna 130, not shown in FIG. 2) along the direction of BE 225 (to point E 230). The incident wave at point E 230 on the top arc 205-1 has the angle α to the radius CE 235 and will reflect from point D (240) as ED 245 with the same angle α. Note that the smaller circle 250 (for example, provided as a conceptual geometric guide or aid to understanding the configuration of the isolation chamber) with the center C 210 denotes (for example, a path) how the waves will bounce back from point E 230 as BE 225 is tangent to this circle 250. The straight line that is continuation of (the piece line) ED 245 will also be tangent to this circle 250 where the tangent point will occur in the continuation of this line after the actual wave hits the lower arc at point D 240 (for example, outside of the cavity of the isolation chamber 200).

Consider each arc 205 to be divided into left and right arc based on the center point 210, i.e., either A or B. For example, arc 205-1 has left and right halves 205-1-A and 205-1-B. Therefore, isolation chamber 200 has arcs 205 in four quadrants, left-top arc 205-1-A, left-down arc 205-2-A, right down arc 205-2-B, and right-top arc 205-1-B. For clarity of discussion, the left-top arc 205-1-A and right-down arc 205-2-B are defined as crosswise of each other while the pair of left-top arc 205-1-A and left-down arc 205-2-A are defined as flipside of each other. Similarly, the pair of right-down arc 205-2-B and right-up arc 205-1-B to be flipside of each other. The two arcs in the top (205-1-A and 205-1-B) or in the down arc (205-2-A and 205-2-B) are defined as adjacent.

In example embodiments, beams transmitted from an origin point in one arc (205) into the crosswise quadrant will reflect back from the corresponding arc in that crosswise quadrant if the incident wave hits the arc 205 where it is covered with reflecting material (for example, a reflector 132). The reflected wave is then transmitted in the direction of its flipside quadrant which reflects when hitting the reflector 132 part of the arc 205 in that quadrant. This is illustrated in FIG. 2 where (for example, an antenna 130 at) point B 220 transmits a beam along BE 225 and the incident wave at E 230 reflects as ED 245 to reach the point D 240. This reflection scenario is referred to herein as Case I.

Due to reciprocity, the beam that originates on the boundary in one quadrant and emitted toward the flipside quadrant will be reflected off of the reflecting part of the arc 205 in this flip-side quadrant and the reflected beam 120 heads toward its crosswise quadrant which means that the beam 120 after the first reflection will be received at the adjacent quadrant to the original quadrant. This is illustrated in FIG. 2 in which a beam is transmitted from point D 240 along DE (for example, along the line of ED 245 in the opposite direction) and the incident wave at E 230 reflects along EB (for example, along the line of BE 225 in the opposite direction) to reach the point B 220. This reflection scenario is referred to herein as Case II.

In the example embodiments described in the following, the WTG control module 136 finds the point and angle of the incident wave after the first reflections by treating two cases mentioned above (Case I and Case II). WTG control module 136 may find the corresponding incident points and angle of incident after any number of reflections because a beam alternatively hits the crosswise quadrant and flip-side quadrant, which will be treated in Case I and Case II, respectively.

Regarding Case I, the transmission scenario can be defined based on the parameters $(\phi, \alpha)$ where $\alpha$ is the angle of the arc AE 255 which uniquely defines the point E 230 in one quadrant with respect to the middle point. The transmission angle is denoted by $\alpha$ which is measured with respect to the radius CE 235 and the transmission angle is defined as always one side of the line CE 235 that results in a ray or beam toward the crosswise quadrant which means there is no ambiguity in the definition of the transmission beam EB (along BE 225) in Case I.

The transmitted signal from E 230 is received at point B 220 with an incident angle $\eta$ with respect to the normal line at that point that is the radius AB 260. Note that the normal line (or orthogonal line) is the line that is perpendicular to the tangent line to the boundary 205 at that point (point B 220). In the following, the system identifies the pair $(\theta, \eta)$ that uniquely determines the incident location and angle, where $\theta$ is the angle between AB 260 and AC 265 which corresponds to the angle of the arc CB 270 (from point C 210 to point B 220).

consider the line EA 255 and denote the angle BEA between BE 225 and EA 255 by $\beta$. $\beta$ is determined as follows.

$$\beta = \pi/2 - \alpha - \phi/2 \qquad \text{Eqn. (1)}.$$

since CA (265)=CE (235) and hence $2\alpha + 2\beta + \phi = \pi$.

On the other hand, the length of EA (255), denoted by a is determined by:

$$a = 2R \sin(\phi/2) \qquad \text{Eqn. (2)}.$$

where R is the radius that is equal to the length of AB (260), AC (265), AD (275), and CE (235).

Hence, the length of the altitude AG 280 in triangle AEB, denoted by b, is given by:

$$b = a \sin \beta. \qquad \text{Eqn. (3)}.$$

The incident angle $\eta$ is then given by $$\eta = \arcsin(b/R) \qquad \text{Eqn. (4)}.$$

since in the triangle AGB we have $\sin \eta = b/R$. Using the series of equations above, and replacing the values, WTG control module 136 determines:

$$\eta = \arcsin(2\sin(\phi/2)\cos(\alpha+\phi/2)) \qquad \text{Eqn. (5)}.$$

To find the angle $\theta$, note that the angle EAC is equal to the angle AEC because the triangle ECA is isosceles with EC=AC. Hence, the angle EAC is equal to $\alpha+\beta$. In triangle AEB, $\beta + (\beta + \alpha + \theta) + \eta = \pi$, and WTG control module 136 determines:

$$\theta = \pi - \eta - \alpha - 2\beta = \phi + \alpha - \eta. \qquad \text{Eqn. (6)}.$$

The above derivation for Case I indicates that if a transmission happens from an angular location $\phi$ with the departure angle $\alpha$ with respect to the normal line at the transmission point toward the crosswise quadrant, the transmission will be received at angular location $\theta = \phi + \alpha - \eta$ where arc sin $(2 \sin (\phi/2) \cos (\alpha+\phi/2))$ is the angle of the incident wave with respect to the normal line at the received point. Hence, WTG control module 136 determines:

$$(\phi, \alpha) \xrightarrow{x} (\phi + \alpha - \arcsin(2\sin(\phi/2)), \qquad \text{Eqn. (7)}$$
$$\arcsin(2\sin(\phi/2)\cos(\alpha + \phi/2))).$$

where the notation x at the top of the arrow means transmission toward the crosswise quadrant.

Regarding Case II, similar to Case I, the transmission scenario is defined based on the parameters $(\phi, \alpha)$ where $\alpha$ is the angle of the arc AE 285 which uniquely defines the point E 230 in one quadrant with respect to the middle point. The transmission angle is denoted by $\alpha$ which is measured with respect to the radius CE (235) and it always has to be in one side of the line CE (235) that results in a ray or beam toward the flipside quadrant which means there is no ambiguity in the definition of the transmission beam EB (225) in Case II. Note that the wave departing the transmission point E (230) for example with departure angle $\alpha$ in one side of the normal line EC (235) will head toward the crosswise quadrant, for example, as indicated by line EB (225), while the transmission from the same angle in the other side of the normal line EC (235) is directed toward the flipside quadrant, e.g., as indicated by ED (245).

The transmitted signal from E (230) is received at point D (240) with an incident angle $\mu$ with respect to the normal line at that point that is the radius AD (275). In the following example embodiments, WTG control module 136 can find the pair $(\gamma, \mu)$ that uniquely determines the incident location and angle, where $\gamma$ is the angle between AD (line 275) and AC (line 265) which corresponds to the angle of the arc CD (290).

From derivation for Case I, WTG control module 136 determines:

$$\beta = \pi/2 - \alpha - \phi/2 \qquad \text{Eqn. (8)}.$$

and $$a = 2R \sin(\phi/2) \qquad \text{Eqn. (9)}.$$

The length of the altitude AH (295) in triangle AEH, denoted by c, is given by $$c = a \sin(\pi - \beta - 2\alpha) \quad \text{Eqn. (10).}$$

The incident angle $\mu$ is then given by $$\mu = \arcsin(c/R) \quad \text{Eqn. (11).}$$

since in the triangle AHD, $\sin \mu = c/R$. Using the series of equations above, and replacing the values, WTG control module 136 determines:

$$\mu = \arcsin(2 \sin(\phi/2)\cos(\alpha - \phi/2)) \quad \text{Eqn. (12).}$$

The cross section of the line AD 275 and EC 235 can be defined as point F. Comparing the sum of the angles in two triangle AFC and EFD, WTG control module 136 determines $\alpha + \mu = \gamma + \phi$. Therefore, the angle $\gamma$ is found as $$\gamma = \alpha - \phi + \mu \quad \text{Eqn. (13).}$$

The above derivation for case II indicates that if a transmission happens from an angular location $\phi$ with the departure angle $\alpha$ with respect to the normal line at the transmission point toward the flip-side quadrant, it will be received at angular location $\gamma = \alpha - \phi + \mu$, where $\mu = \arcsin(2 \sin(\phi/2) \cos(\alpha - \phi/2))$ is the angle of the incident wave with respect to the normal line at the received point. Hence, WTG control module 136 determines:

$$(\phi, \alpha) \xrightarrow{F} (\phi + \alpha - \arcsin(2\sin(\phi/2)\cos(\alpha + \phi/2), \quad \text{Eqn. (14)}$$
$$\arcsin(2\sin(\phi/2)\cos(\alpha + \phi/2)))).$$

where the letter F at the top of the arrow means transmission toward the flipside quadrant.

Multiple reflection points can be derived as follows. Note that the crosswise transmission will be always followed by the flipside transmission and vice versa. Hence, by using alternative combination of the equations (7) and (14), WTG control module 136 determines the angular location and the angle of incident wave after an arbitrary reflection if the lower and upper arcs are of the angular length $2\pi/3$.

However, for shorter arc length, WTG control module 136 can determine how many reflections after which the wave may escape the cavity from its opening. In the following, properties of the reflection when the transmission is toward the crosswise or flip-side quadrant are described. These properties can then be used in the design of an isolating chamber 200.

Consider the point E 230 that is located at angular location $\phi$ with respect to center of the arc on the top (205-1) that is denoted by C 210. For any departure angle $\alpha$ and an angular location $\phi$ (alternatively denoted as $\varphi$ at point C 210, as shown in FIG. 2) for the originating transmission point, the angular location of the second reflection point is located in the adjacent quadrant with respect to the quadrant of the originating point. WTG control module 136 can verify this by examining the Case I and Case II in the previous section and referring to the equations (7) and (14). WTG control module 136 can also determine the angular position and angle of incident wave for the reception point of the second reflection. The range of the values for the angular position and angle of incident wave for the reception point of the second reflection are clarified as shown in the following paragraph.

For any incident angle $\alpha$ and a given angular location $\phi$ for the originating transmission point, the angular location of the second reflection point is (for example, absolutely) less than the angular location of the originating point if the first transmission is toward a crosswise quadrant.

For incident angle $\alpha$ bounded as $0 \leq \alpha \leq \alpha_B$ and a given angular location $\phi$ for the originating transmission point, the angular location of the second reflection point is bounded by some value $\phi_C$, where $\pi/3 \geq \phi_C \geq \phi_B$. This proposition can be proved because the angular location of the second reflection point is either monotone increasing or monotone decreasing function of the incident angle. Although this function (the angular location of the second reflection point based on the incident angle $\alpha$ and an originating angular location $\phi$) depends on the value of the originating angular location, WTG control module 136 can take the supremum of all possible angles over the set of originating angular locations to find the value of $\phi_C$. Please note that the subscripts B and C in, for example, $\phi_C$, denote that $\phi_B$ or $\phi_C$ are two values related to some angular positions that the subscripts are not related to points B and C in the FIG. 2.

Figure 3:
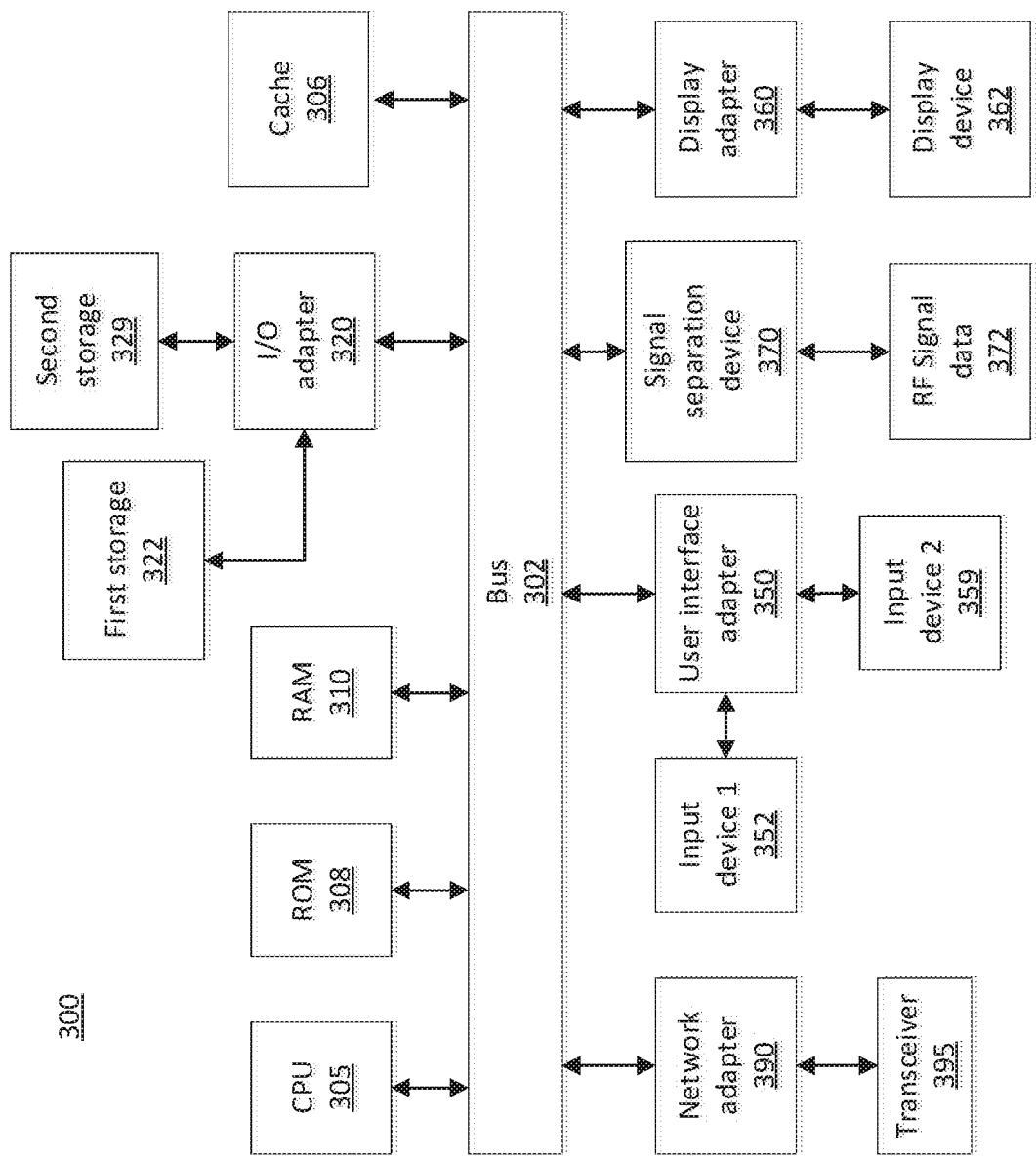
FIG. 3 is a block diagram illustrating a high-level system for implementing a walk-through gate with signal separation, in accordance with an embodiment of the present invention.

Referring now to FIG. 3, a high-level system for implementing a walk-through gate with signal separation is illustratively depicted in accordance with an embodiment of the present invention.

Exemplary computer system (e.g., a server or a network device) for implementing a walk-through gate with signal separation is shown in accordance with an embodiment of the present invention. The computer system 300 includes at least one processing device (CPU) 305 operatively coupled to other components via a system bus 302. A cache 306, a Read Only Memory (ROM) 308, a Random-Access Memory (RAM) 210, an input/output (I/O) adapter 320, a network adapter 390, a user interface adapter 350, a signal separation device 370, and a display adapter 360, can be operatively coupled to the system bus 302.

A first storage device 322 and a second storage device 329 can be operatively coupled to system bus 302 by the I/O adapter 320. The storage devices 322 and 329 can be any of a disk storage device (e.g., a magnetic or optical disk storage device), a solid-state magnetic device, and so forth. The storage devices 322 and 329 can be the same type of storage device or different types of storage devices. Either or both of the storage devices 322 and 329 can be configured to operate as a data store or database to store various logs of RF signal data 372 (e.g., initial signal strength and signal measurements from various portions of the WTG). The signal separation device 370 can include software and/or hardware as described herein below.

A transceiver 395 can be operatively coupled to system bus 302 by network adapter 390. A display device 362 is operatively coupled to system bus 302 by display adapter 360. Radio frequency identifier (RFID) (reader) data 372 can be operatively coupled to system bus 302 directly or indirectly, for example via signal separation device 370. The signal separation device 370 can be configured to receive RF signal data 372.

A first user input device 352 and a second user input device 359 can be operatively coupled to system bus 302 by user interface adapter 350. The user input devices 352 and 359 can be any of a sensor, a keyboard, a mouse, a keypad, a joystick, an image capture device, a motion sensing device, a power measurement device, a microphone, a device incorporating the functionality of at least two of the preceding devices, and so forth. Of course, other types of input devices can also be used in accordance with the present invention. The user input devices 352 and 359 can be the same type of user input device or different types of user input devices. The user input devices 352 and 359 can be used to input and output information to and from system 300.

Other embodiments of the present invention can optionally include further processing units including a graphics processing unit ("GPU"), a mother board, or alternatively/additionally another storage medium, an operating system, one or more application software, as well as including one or more communication interfaces (e.g., RS232, Ethernet, Wi-Fi, Bluetooth, USB). Useful examples of computing devices optionally included in or integrable with embodiments of the present invention include, but are not limited to, personal computers, smart phones, laptops, mobile computing devices, tablet PCs, and servers. In accordance with embodiments of the present invention, an event record log source can be a computer storage medium.

Of course, the computer system 300 can also include other elements (not shown), as readily contemplated by one of skill in the art, as well as omit certain elements. For example, various other input devices and/or output devices can be included in computer system 300, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the computer system 300 are readily contemplated by one of ordinary skill in the art given the teachings of the present invention provided herein.

It should be understood that multiple computing devices can be operably linked to form a computer network in a manner as to distribute and share one or more resources, such as clustered computing devices and server banks/farms. In embodiments of the present invention each of the aforementioned elements (e.g., device, medium, source, or module) can be directly or indirectly communicably connected (e.g., via a wireless a wired electronic connection) to at least one other element of the system. As described in more detail below, some embodiments of the present invention can be wholly contained within a single computing device. Other embodiments, however, can encompass a plurality of interconnected or networked devices and resources.

Figure 4:
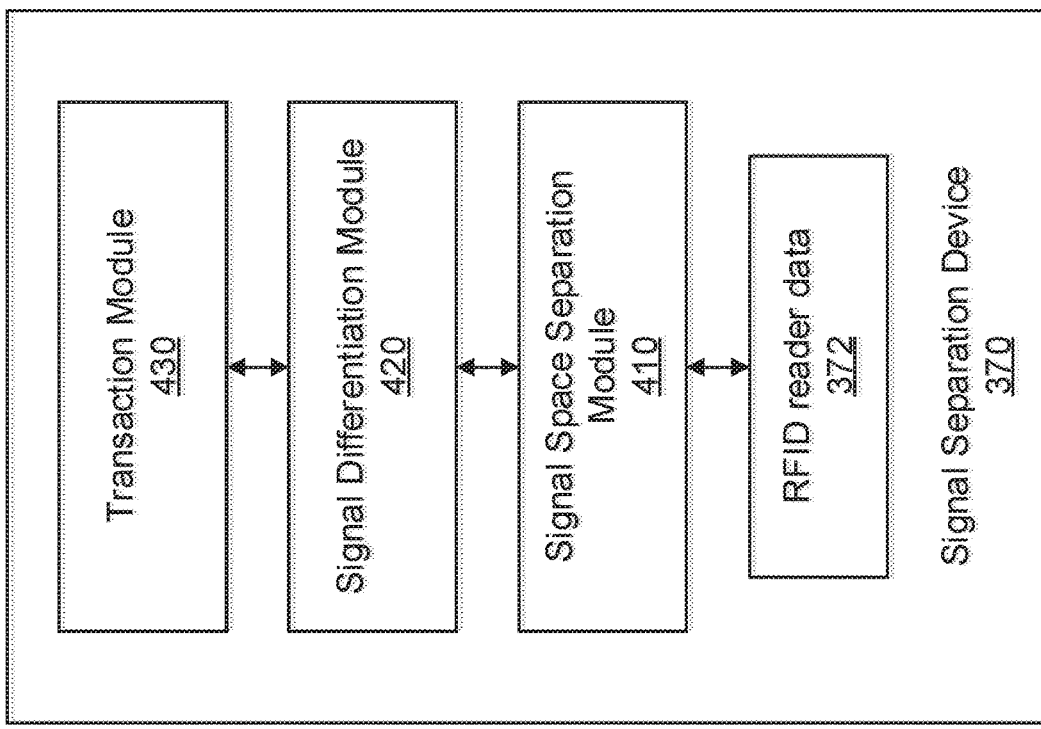
FIG. 4 is a block diagram is a block diagram illustrating a system configured to implement signal separation, in accordance with the present invention.

FIG. 4 is a block diagram illustrating a signal separation device 370 configured to implement signal separation, in accordance with example embodiments.

As shown in FIG. 4, signal separation device 370 includes an RFID reader data module 372, a signal space separation module 410, a signal differentiation module 420 and a transaction module 430.

RF signal data module 372 receives RF signal data, for example, from WTGs 100 and/or alternatively from stored training data sets. The RF signal data can include signals transmitted from RFID tags 150 located within the WTG 100 and signals transmitted from outside of the WTG 100.

According to example embodiments, the WTG system can include (i) a physical structure that includes the curvature designed in described herein as the WTG walls or inside the WTG wall, (ii) a reader module including a set of antennas that are located inside WTG as well as outside WTG, and (iii) (in some implementations) a signaling module including lamps, digital screens, microphones, cameras, and loudspeakers to perform human interactions.

When single or multiple RFID tags 150 go through the WTG 100, the reader interrogates the RFID tags 150 and reply signals (RFID reader data 372) from the RFID tags 150 will be received by the antennas. The designed curvature as described herein facilitates receipt of the reply from the RFID tags 150 that are physically located inside WTG primarily by inside antennas and not by outside antennas. Similarly, the reply from RFID tags 150 that are located outside WTG 100 will be received by the antennas that are outside WTG 100.

Signal space separation module 410 can implement signal space separation between a region inside of the walk-through gate structure and a region outside of the walk-through gate structure. According to an example embodiment, based on the readings of an RFID tag 150 within a given time window (called a session), signal space separation module 410 can decide if the RFID tag 150 is inside or outside the WTG 100. To make such decisions, signal space separation module 410 can consider all the readings including the number of readings, the received antenna port number, as well as the signal strength.

Signal differentiation module 420 determines whether the signal was transmitted from a radio frequency identifier (RFID) within the boundaries of the walk-through gate structure.

Transaction module 430 processes transactions based on RFID tags 150 in response to determining that signals from the RFID tags 150 were transmitted from within the boundaries of the walk-through gate structure.

Figure 5:
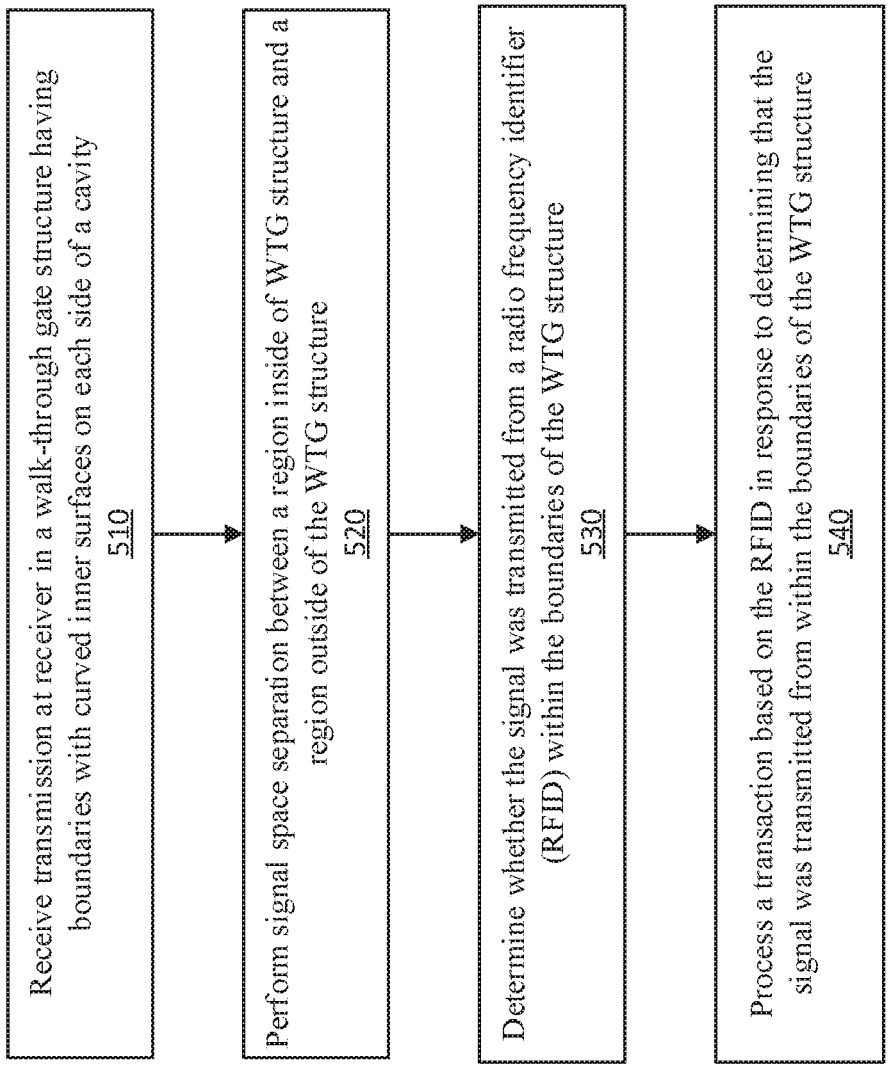
FIG. 5 is a flow diagram illustrating a method for implementing a walk-through gate with signal separation, in accordance with an embodiment of the present invention.

FIG. 5 is a flow diagram illustrating a system/method 500 for implementing a walk-through gate with signal separation, in accordance with the present invention.

At block 510, signal separation device 370 receives a transmission at a receiver positioned in a walk-through gate structure having boundaries with curved inner surfaces on each side of a cavity. The cavity includes a walk-through area through which RFID tags can be carried. The curved inner surfaces are covered by a reflective material.

At block 520, signal separation device 370 performs signal space separation between a region inside of the walk-through gate structure and a region outside of the walk-through gate structure.

At block 530, signal separation device 370 determines whether the signal was transmitted from a radio frequency identifier (RFID) within the boundaries of the walk-through gate structure.

At block 540, signal separation device 370 processes a transaction based on the RFID in response to determining that the signal was transmitted from within the boundaries of the walk-through gate structure.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A walk-through gate device, comprising:
   a walk-through gate structure having boundaries including curved inner surfaces on each side of a cavity, wherein the curved inner surfaces are at least partially covered by a reflective material;
   at least one radio frequency (RF) signal transmitter;
   at least one RF signal receiver; and apertures that provide access to the cavity of the walk-through gate structure;

at least one signal processing unit configured to perform signal space separation between a region inside of the walk-through gate structure and a region outside of the walk-through gate structure wherein the at least one signal processing unit performs the signal space separation based on a received signal strength, a time of the reply, a number of replies received from a tag and an antenna port number.

2. The walk-though gate device of claim 1, wherein at least one of the at least one RF signal transmitter and the at least one RF signal receiver are positioned tangent to the curved inner surface.

3. The walk-through gate device of claim 1, wherein the at least one RF signal transmitter generates a signal that is transmitted toward a point on the curved inner surfaces that reflects inside the cavity.

4. The walk-through gate device of claim 1, wherein the at least one RF signal transmitter generates a signal that is transmitted toward a point on the curved inner surfaces, the signal emerging from the cavity after a predetermined minimum attenuation.

5. The walk-through gate device of claim 1, wherein any signal that enters the cavity has to escape the cavity through finite reflections or is absorbed by at least one RF absorber positioned on the curved inner surfaces.

6. The walk-through gate device of claim 1, wherein the curved inner surfaces include multiple arcs of at least one circle in a two-dimensional cross section.

7. The walk-through gate device of claim 1, wherein a mid-section of the curved inner surfaces includes RF reflective material and a remaining section of the curved inner surfaces includes RF absorbing material.

8. The walk-through gate device of claim 1, wherein for a transmission toward a quadrant within the cavity with an incident angle $\alpha$, relative to a reference line through an aperture of the cavity, and a given angular location angle $\varphi$ for an originating transmission point relative to the reference line, an angular location angle of a second reflection point being less than the given angular location angle of the originating transmission point.

9. The walk-though gate device of claim 1, wherein the curved inner surfaces include a convex surface comprised of RF reflective material.

10. The walk-though gate device of claim 9, wherein at least part of a perimeter of the convex surface comprised of RF reflective material is lined with RF absorbing material.

11. A walk-through gate device, comprising:
a walk-through gate structure having boundaries formed from arcs of ellipses on each side of a cavity, wherein the boundaries are at least partially covered by a reflective material;
at least one radio frequency (RF) signal transmitter positioned tangent to the boundaries;
apertures that provide access to the cavity of the walk-through gate structure;
at least one RF absorber positioned on the boundaries;
at least one RF receiver positioned tangent to the boundaries; and
at least one signal processing device configured to perform signal space separation between a region inside of the walk-through gate structure and a region outside of the walk-through gate structure wherein the at least one signal processing unit performs the signal space separation based on a received signal strength, a time of the reply, a number of replies received from a tag and an antenna port number.

12. The walk-through gate device of claim 11, wherein the at least one receiver is configured to receive transmission signals from at least one radio frequency identifier (RFID) within the boundaries of the walk-through gate structure.

13. The walk-through gate device of claim 11, wherein the at least one RF signal transmitter generates a signal that is transmitted toward a point on the curved inner surfaces and is absorbed in the cavity after multiple reflections.

14. The walk-through gate device of claim 11, wherein the at least one RF signal transmitter generates a signal that is transmitted toward a point on the curved inner surfaces, the signal emerging from the cavity after a predetermined minimum attenuation.

15. The walk-through gate device of claim 11, wherein the boundaries comprise curved inner surfaces arranged in mirror image to each other.

* * * * *